United States Patent [19]

Comer

[11] 4,235,068
[45] Nov. 25, 1980

[54] FILAMENT MOWER

[75] Inventor: Robert C. Comer, Hopkins, Minn.

[73] Assignee: The Toro Company, Minneapolis, Minn.

[21] Appl. No.: 821,144

[22] Filed: Aug. 2, 1977

[51] Int. Cl.³ .......................................... A01D 35/262
[52] U.S. Cl. ..................................... 56/12.7; 56/13.4; 56/295
[58] Field of Search ...................... 56/12.7, 17.5, 255, 56/295, 13.4; 30/276

[56]  References Cited
U.S. PATENT DOCUMENTS

| 2,779,146 | 1/1957 | Mitchell et al. | 56/13.4 |
| 3,664,102 | 5/1972 | Reber | 56/12.7 |
| 4,024,635 | 5/1977 | Mizuno et al. | 56/12.7 |
| 4,112,653 | 9/1978 | Ballas et al. | 56/12.7 |

Primary Examiner—Jay N. Eskovitz
Attorney, Agent, or Firm—Merchant, Gould, Smith, Edell, Welter & Schmidt

[57] ABSTRACT

A lawnmower using flexible non-metallic filaments as cutting elements is disclosed. In certain specific embodiments the lawnmower may include a stored supply of four lengths of such filament, the free ends of which protrude from a member driven about a nearly vertical axis. Means for metering out line are also disclosed. The mower may include an axial flow fan mounted above the flexible filament cutting apparatus for the purpose of agitating uncut grass and for the purpose of evacuating cut grass particles from the mower housing.

5 Claims, 7 Drawing Figures

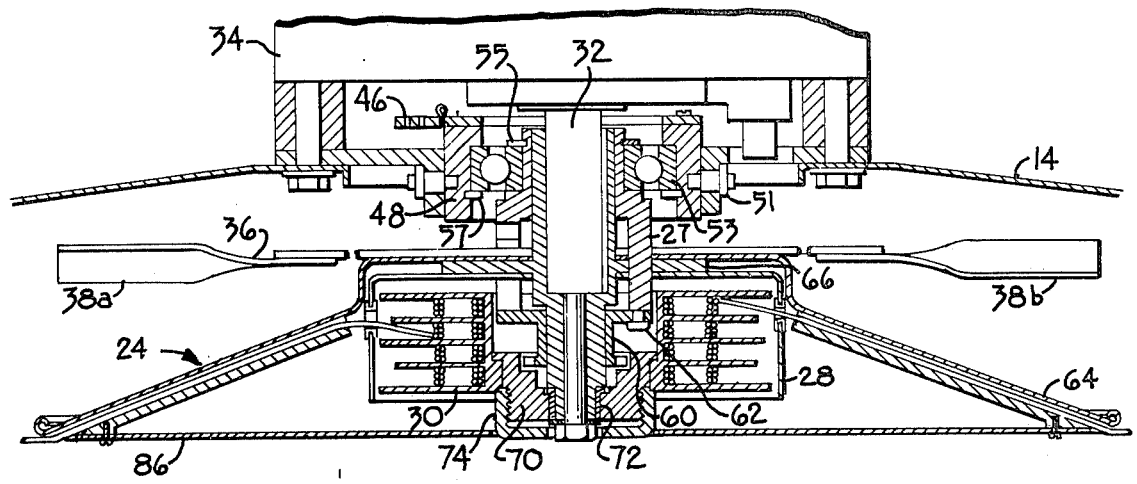
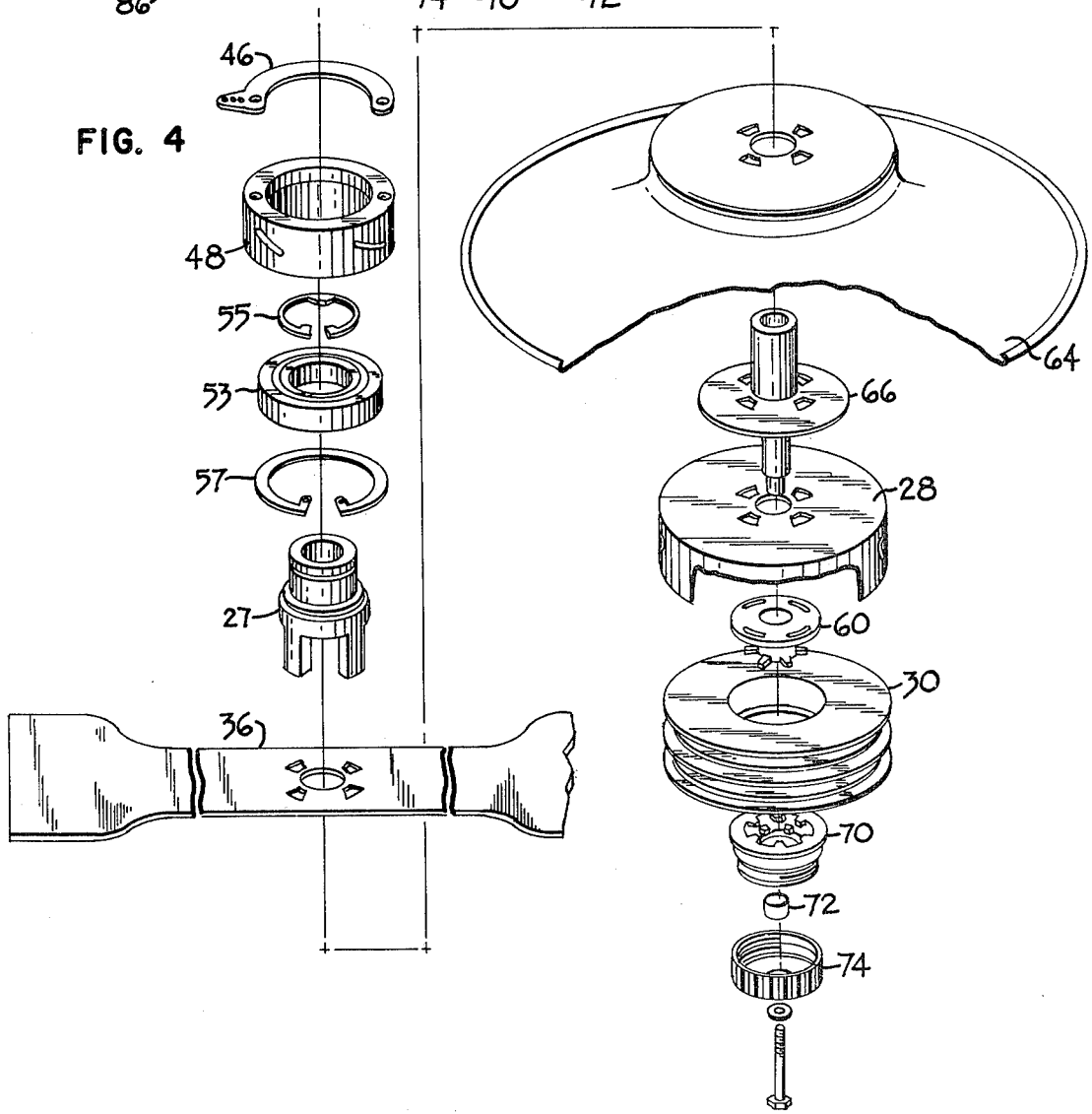

FILAMENT MOWER

BACKGROUND OF THE INVENTION

This invention relates generally to apparatus used for cutting vegetation, and more particularly relates to a lawnmower of the type in which the cutting elements are mounted for rotation about a neary vertical axis within the mower housing. The present invention is a lawnmower which utilizes cutting of grass achieved by contact between the grass and free lengths of highly flexible filament mounted for rotation about a nearly vertical axis.

Trimming and edging utilizing a trimmer which uses a filament spun at high speed about an axis is known. Such a concept is generally disclosed in U.S. Pat. No. 3,693,225 to Langenstein. Further, U.S. Pat. No. 3,664,102 to Reber teaches a cutter mechanism of more general application to cutting vegetation in agriculture and lawn mowing applications in which nylon filaments are disclosed as cutting elements. In various of the embodiments shown in the Reber patent, multiple filaments mounted on a single cutting head is shown.

It is also known to provide rotary cutting elements in which the cutting elements are somewhat more flexible than the traditional relatively rigid steel blades, either by providing metal blades with a resilient connection to a central member or, in the case of a recently introduced lawnmower, sometimes referred to as a Roper "Whip-Stick" mower, cutting elements which are relatively short replaceable plastic pegs of a generally conical section which purportedly have significantly more give and flexibility than conventional rigid mounted steel bladed configurations.

Distinctly different problems from those addressed by trimming and edging devices are addressed in a residential or other ornamental lawn cover cutting applications. While the trimming and many general vegetation cutting applications do not require precise control and even height-of-cut, this is not true in residential and ornamental lawn cover applications. Also, trimming and edging operations do not involve cutting large amounts of vegetation, and trimmers and edgers therefore do not face the problem of disposing of cut vegetation. In residential lawn mowing usage, the user's demand that the machine have an ability to both cut the grass at a finely controlled height-of-cut and provide means for collecting or disposing of the cut grass particles must be met.

In addition, by comparison to the trimmer and edger applications in which filament cutters have typically been used, the lawn mowing application represents a very signficant increase in instantaneous vegetation load to be cut during normal operation. In a trimmer and edger, the load is easily controlled by the user merely by the rate at which the trimmer is moved through the vegetation to be trimmed or edged. In the lawnmowing application, slowing down or making repetitive passes over a single portion of a lawn would be highly objectionable from a consumer standpoint.

By comparison to the traditional fixed rigid blade machines, the advantages of a lawnmower capable of operating with highly flexible filament type cutting elements are significant. First, because of the resiliency of the cutting elements, they can strike solid objects on the lawn surface without significant damage to the mower drive structure, as the cutting element will readily flex. Second, in embodiments where means are provided for metering out replenishing lengths of filament, the mower does not require sharpening or blade maintenance. Yet, to the best of applicant's present knowledge, there is presently no commercially available mower for residential and other ornamental lawn covers utilizing highly flexible filament type cutting elements.

Applicant has developed a mower suitable for lawn cutting applications which utilizes highly flexible filament type cutting elements of a replenishable nature, and yet provides a system in which agitation of uncut grass and orderly evacuation of a mower housing can be achieved. In addition, with applicant's invention, cutting at a height sufficiently controlled to result in acceptable ornamental lawn cover appearance without a noticeable scalloping effect caused by successive cuts and without an unacceptable number of risers, that is, uncut grass filaments, is achieved.

SUMMARY OF THE INVENTION

In accordance with the invention, rotary mowing apparatus including a housing having a top wall and adjoining side walls of a conventional nature may be provided. The housing, together with the ground surface, defines a grass cutting chamber. Means are provided for mounting this housing to enable movement of the housing over the ground surface at a controlled height above it. These means may be conventional ground engaging wheels mounted to the housing or other suitable suspension elements.

The rotary mower of applicant's invention is provided with filament mounting means mounted within the grass cutting chamber for rotation about a nearly vertical axis. A plurality of flexible nonmetallic filaments are mounted to the filament mounting means at positions spaced about the axis and radially spaced from it. At least a portion of each of the filaments extends generally radially outward with respect to the mounting means during driven rotation of the mounting means. The filaments have free unsupported lengths sufficiently short, so that, during cutting operations, the free unsupported lengths of filament define a plane substantially perpendicular to the axis. Each of the filaments has a generally constant cross-sectional thickness of substantially 0.125 inches or less throughout its free length.

The mower is provided with means for rotatably driving the filament mounting means at a speed sufficient to stiffen the filaments and to permit impact cutting of uncut grass thereby. Also means for agitating uncut grass filaments within the grass cutting chamber as the housing passes over the ground surface to promote even cut are provided.

In certain specific embodiments of the present invention, it has been found preferable to utilize filaments having a thickness in the range of substantially 0.060 inches to substantially 0.125 inches, and to construct the device with a free extended length of the filaments between substantially one inch and four inches. Filaments with a thickness in this range have been found to have a sufficiently long operating life, and free lengths selected within this range have been discovered to present a noticeably cup-like cutting swath or scalloping effect which could be objectionable to a user.

In addition, in certain embodiments it has been found desirable to shape the outer surface of the mounting means generally as a truncated cone and to place an axial flow fan above the filaments to promote both agitation of the uncut grass particles and to provide for orderly transport and evacuation of particles once they have been severed by the filament cutting elements.

BRIEF DESCRIPTION OF THE DRAWINGS

FIG. 3 is an enlarged fragmentary sectional view of a portion of the housing and other elements of a particular embodiment of the present invention;

FIG. 4 is an exploded perspective view of certain filament mower apparatus components;

DESCRIPTION OF THE PREFERRED EMBODIMENT

Figure 1:
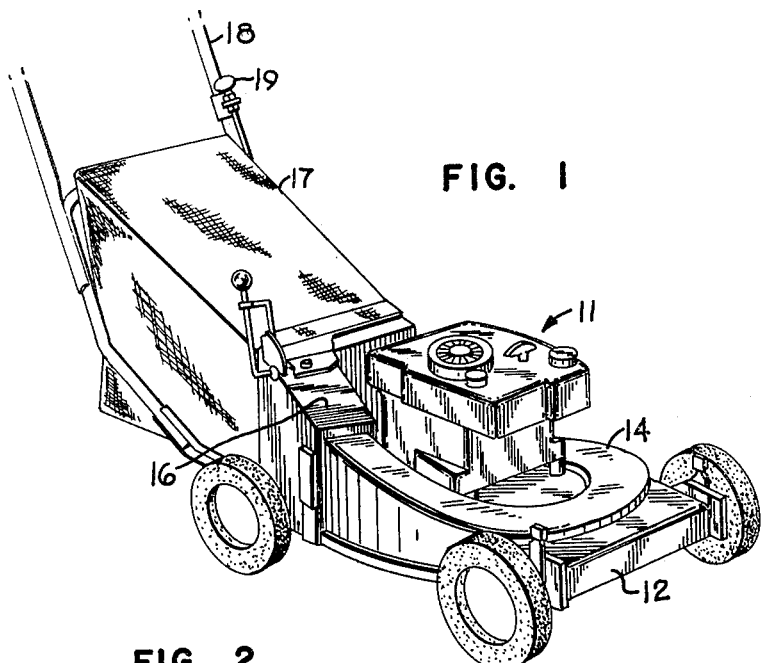
FIG. 1 is a perspective view of a lawnmower constructed according to one embodiment of the present invention.

In FIG. 1, a lawnmower of the type in which cutting elements are mounted for rotation about a nearly vertical axis within a housing is generally designated by the numeral 11. Lawnmower 11 comprises a housing 12 having side walls 13, and a top wall 14. Housing 12 may, as shown in FIG. 1, have an expansion chamber around its periphery leading to a discharge portion 16 to which a cutting collecting receptacle or bag 17 may be attached.

An operator's handle 18 is pivotally carried at the rear of housing 12, the handle 18 serving a secondary function of supporting part of grass catching bag 17. A control handle 19, used for the purpose of controlling the metering of replenishing lengths of the filament cutting elements, is mounted on handle 18.

Figure 2:
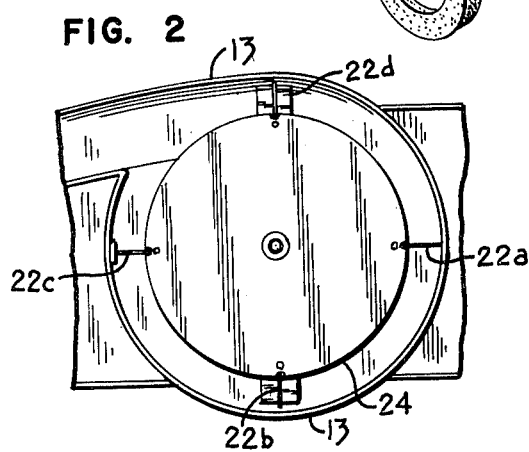
FIG. 2 is a fragmentary view in bottom plan of the lawnmower.
Figure 5:
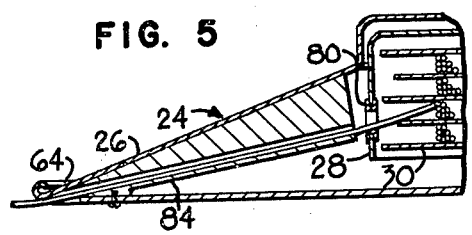
FIG. 5 is a fragmentary view similar to FIG. 3, showing in particular an embodiment of a filament guide.

Although the lawnmower 11 is generally conventional in appearance and has what appears to be a conventional rotary drive, it is non-conventional in the sense that it utilizes a plurality of highly flexible filament cutting elements to perform the function of cutting of vegetation. Thus, with reference to FIG. 2, it will be seen that lawnmower 11 includes four free lengths of highly flexible filament 22 A-22 D. The filaments extend generally radially outward from the nearly vertical rotational axis of the filament mounting means or guide drum 24.

The filaments are preferably constructed of lengths of a nonmetallic line having a cross-sectional dimension in the range of 0.060 to 0.125 inches. In one specific embodiment, a resinated nylon line of substantially circular cross-section, with a diameter of 0.095 inches and a specific gravity of 1.211 has been used. The commercial designation for this line is LEECO PRODUCTS NO. CG500 MONOFILAMENT LINE.

It is presently believed that use of filament material substantially outside the range of 0.060 to 0.125 inches in cross-sectional thickness will not result in acceptable performance. At thicknesses substantially below 0.060, flexing of the filament due to grass particle impact and wind drag are likely to result in unacceptable cut, and filament life is unacceptably short. At cross-sectional thicknesses substantially above 0.125 inches, the filament begins to become too thick so that the unit pressure transferred to uncut grass particles upon impact may not be sufficient to cleanly sever the particles.

It has been found preferable to have the free unsupported lengths of filament limited substantially to within the range of 1" to 4" in length. In attempting to construct an acceptable filament mower, it was discovered, that at filament free lengths in the vicinity of 4", the heavy loading caused by cutting of a well established lawn, in combination with other effects in the mowing environment, results in a substantial upward deflection of the tips of free unsupported lengths 22 A-D. This upward deflection tends to result in a cup-like cut in a single swath. This is highly objectionable in normal use because subsequent parallel passes will give the lawn a scalloped appearance which will not be acceptable. On the other hand, with free lengths in the vicinity of $2\frac{1}{2}$" to 3", the effect is sufficiently minimized so that appearance of the lawn does not deteriorate. At the other end of the range, having free lengths in the vicinity of 1" tends to result in an unacceptable number of risers, that is, filaments of grass which are not cut in passing over the lawn surface.

The free unsupported lengths of filament 22A-D are fastened at their supported end to a filament mounting means 24. Filament mounting means 24 establishes a plane of cut and supports the free lengths of filament 22A-D at a controlled radius from the axis of rotation. In the specific embodiment shown, filament mounting means 24 is a drum having an outer surface 26 which is generally in the shape of a truncated cone. Located centrally of filament mounting means or drum 24 is an inner guide drum 28 containing a stacked spool configuration 30. Spool configuration 30 includes 4 vertically spaced sub-spools, each of which has a coil of stored filament which may be metered out to replenish free lengths 22 A-D when they wear out, fray, break off, or otherwise lose their ability to continue to cut grass cleanly and efficiently.

Figure 6:
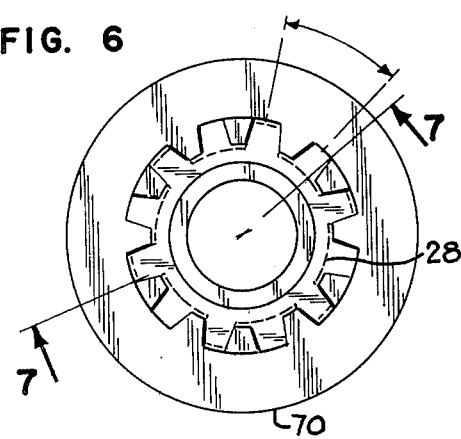
FIG. 6 is an enlarged view in top plan of a drive member and a driven member of the filament metering apparatus.
Figure 7:
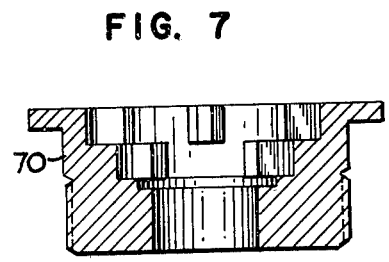
FIG. 7 is a transverse sectional view of the members shown in FIG. 6.

FIGS. 4, 6 and 7 illustrate the means for metering out additional filament. The filament metering means will be only generally described in the present application, as the filament metering or feed mechanism is described and claimed in greater detail in a co-pending application assigned to the same assignee.

Mounted for rotation with drum 24 about a nearly vertical axis defined by the shaft 32 of an engine 34 shown fragmentarily in FIG. 3, is an axial flow fan 36. Axial flow fan 36 contains a pair of blades 38 A-B at opposite ends of an elongated central portion 40. It is preferred to have the blades 38 A-B positioned with respect to filament mounting drum 24 and associated filaments 22 A-D so that the active portions 38 A-B are spaced outboard of the periphery of drum 24. Stated another way, blades 38 A-B are vertically spaced above the cutting region defined by the free unsupported lengths 22 A-D. Axial flow fan 36 establishes significant air flow within housing 12. It aids in the performance of three very important functions. First, it agitates uncut grass particles so that, in successive passes by the filaments, the average position of the grass is near perpendicular and evenness of cut is achieved. Second, it suspends cut grass particles above the cutting mechanism defined by elements 22 A-D and drum 24. Third, it provides orderly transport of the suspended particles to grass catching bag 17.

In order to have sufficient space within housing 12 to cut grass in the cutting plane defined by filaments 22

A-D and suspend and evacuate grass particles with a vertically spaced axial flow fan such as fan 36, it is preferable to have a housing of substantial heighth from the bottom of the side wall 13 to top wall 14. A housing with a vertical heighth of 3" to 4" is preferable for use in conjunction with the present invention.

In addition, it has been found that the truncated cone shape of drum 24 is a preferable shape. The inclined nature of the cone tends to promote cleaning and a sliding of cut grass particles which might otherwise deposit themselves on the cone outward to promote their suspension and evacuation by fan 36. This minimizes problems due to grass buildup on the internal surfaces of the filament mounting means, which might otherwise result in eventual deposit of clumps of compressed particles on the lawn in an unsightly fashion. At the same time, the truncated cone type surface provides a ready guide for lengths of filament being metered out from spool 30 to the peripheral edge of drum 24.

During operation of the mower in the present invention, it is likely that it may be necessary to meter out additional lengths of line after several thousand square feet of lawn surface have been covered. When this is desired, the operator merely pulls or pushes on control handle 19, depending on the position of control handle 19 at the time metering of line is desired. Control handle 19 is attached by means of a Bowden wire connection to a control arm 46. Control arm 46 is attached to a indexing cylinder 48 by means of screws or other suitable connection. Operation of the control arm 46 by means of control handle 19 rotates indexing cylinder 48. Indexing cylinder 48 has ramp slots 49 into which pins 51, which are stationarily mounted with respect to the mower housing, are fitted. Therefore the rotation of control arm 46 results in an upward or downward movement of indexing cylinder 48. Transfer of this axial movement occurs through bearing 53, associated snap rings 55 and 57, and indexing slide 27 to a driver element 60 which may be secured to four legs at the bottom of slide 27 by means of screws or rivets 62, one of which is shown in FIG. 3.

With particular reference to FIG. 4, it will be understood that the extended legs of slide 27 extend through appropriate apertures in blade 36, a filament mounting drum cover 64, a shaft hub 66, and spool cover 28. This enables the driver element 60 to move upward and downward with respect to a driven element 70 having two axially spaced and angularly displaced sets of teeth. The driven element 70 and spool 30 are driven by means of the teeth on driver element 60. An annular bearing 72 permits relative rotation between the spool, driven elements 70 and spool cap 74, and the remainder of the structure which is rotatably driven by the engine.

Therefore, metering of line occurs when there is a shift in engagement between driver element 60 and driven element 70. The axial shift of driver element 60 to engagement with a new set of driven teeth, since the pairs of teeth on element 70 are angularly displaced as shown particularly in FIG. 6, permits lost angular motion between the drive and the spool. This permits a slight unwinding of the spool to occur and line is automatically metered out.

To facilitate metering of line, element 28 may be provided with grommets 80, and filament mounting means cover 64 may include tubular filament guides 84 fastened to its inner surface at appropriate points angularly spaced about the axis of rotation. Also, a cover 86 may be secured to the drum 24 or other suitable means may be provided to enclose and prevent dirt and other foreign matter from affecting the spool structure.

FIG. 3 particularly shows the filament guide and grommets for the two upper segments of spool 30. The two lower segments might be similarly configured but shifted angularly by 90°.

In operation, the filaments are preferably driven at a speed such that their free lengths travel in the range of 15,000 to 22,000 FPM. In order to reduce power losses and eliminate drag, it has been found preferable to slightly tip the axis of rotation so that the plane defined by the filaments is lower towards the front of the mower. In one particular embodiment a tipping of this axis which resulted in a difference of one-half inch in heighth from the front to the rear of the cutting plane was found successful on a 21 inch machine.

From the foregoing, it is apparent that the applicant has provided a mower using filament cutting elements which operates successfully, produces an even and controlled height of cut without undesirable scalloping of a lawn surface, and provides for orderly suspension and evacuation of cut grass particles from the housing. It will be understood that a number of modifications and alternatives will be apparent to those of skill in the art. Accordingly, it is intended to embrace all alternatives, modifications, and variations as fall within the spirit and broad scope of the appended claims.

What is claimed is:

1. Rotary mowing apparatus, comprising, in combination:
   (a) a housing having a top wall and adjoining side walls;
   (b) means mounting said housing to enable movement of said housing over a ground surface at a controlled height thereabove, so that said housing, together with said ground surface, defines a grass cutting chamber;
   (c) filament mounting means mounted within said chamber for rotation about a nearly vertical axis, said mounting means including an outer surface generally shaped as a truncated cone;
   (d) a plurality of flexible nonmetallic filaments mounted to said filament mounting means at positions spaced about said axis and radially spaced therefrom, at least a portion of each of said filaments having a free unsupported length extending generally radially outward from said mounting means during driven rotation thereof, said free unsupported lengths being sufficiently short so that, during cutting operations, said filament segments define a plane substantially perpendicular to said axis, each of said filaments also having a generally constant cross-section throughout its free unsupported length and a thickness of substantially 0.125 inches or less; said free unsupported lengths of said filaments extending from said cone surface proximate the base thereof;
   (e) means for agitating uncut grass filaments within said chamber as said housing passes over said ground surface; and
   (f) means rotatably driving said filament mounting means at a speed sufficient to stiffen said filaments and to permit impact cutting of uncut grass filaments thereby.

2. The apparatus of claim 1, wherein said means for agitating comprises an axial flow fan mounted vertically spaced from said filament free lengths and mounted for rotation about said axis with said filament mounting means.

3. In combination in a rotary mower of the type in which cutting elements are mounted for rotation about a nearly vertical axis within a mower housing, said housing being adapted for movement across a ground surface with said cutting elements at a controlled height above the surface and having a discharge opening for discharge of cut grass particles therefrom, the improvement which comprises:
   (a) a plurality of lengths of flexible filament carried by and rotatably driven by said mower within said housing, portions of said lengths being unsupported and extending radially outwardly from said axis for impact with uncut grass during operation of said mower; said unsupported lengths being in the range of 1" to 4" in length;
   (b) a central filament mounting element, said element having an outer surface shaped generally in the form of a truncated cone having an axis aligned with said nearly vertical axis, with said filament unsupported lengths protruding at angularly spaced points from said element proximate the base of said conical surface; and
   (c) an axial flow fan mounted for rotation within said housing, said fan having active blade portions spaced vertically above said unsupported lengths.

4. The mower of claim 3, where said filaments have a cross-sectional thickness in the range of substantially 0.060–0.125 inches, and four lengths of filament protrude from said mounting element for impact with uncut grass.

5. The mower of claim 3, wherein said filaments have a cross-sectional thickness in the range of substantially 0.060–0.125 inches, and said filament mounting element further includes a plurality of filament guides extending between said spool and the outer surface thereof, said filament guides defining passages which are downwardly angularly inclined from said spool to the cutting plane established by said filament free lengths.

* * * * *